US012639177B2

(12) United States Patent
Borrmann et al.

(10) Patent No.: US 12,639,177 B2
(45) Date of Patent: May 26, 2026

(54) METHOD FOR FAULT-TOLERANT OPERATION OF A PROCESSING UNIT AND OF A PROCESSING ARRANGEMENT, CIRCUIT ARRANGEMENT, AND COMPUTING UNIT

(71) Applicant: Robert Bosch GmbH, Stuttgart (DE)

(72) Inventors: Jan Micha Borrmann, Mannheim (DE); Michael Beyer, Stuttgart (DE); Andre Guntoro, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 34 days.

(21) Appl. No.: 18/818,692

(22) Filed: Aug. 29, 2024

(65) Prior Publication Data

US 2025/0077363 A1 Mar. 6, 2025

(30) Foreign Application Priority Data

Sep. 6, 2023 (DE) ..................... 10 2023 208 612.3

(51) Int. Cl.
*G06F 11/16* (2006.01)
(52) U.S. Cl.
CPC ...... *G06F 11/165* (2013.01); *G06F 2201/805* (2013.01)
(58) Field of Classification Search
CPC ..... G06F 11/165; G06F 11/1654; G06F 11/07
USPC ...................................................... 714/10, 1
See application file for complete search history.

(56) References Cited

U.S. PATENT DOCUMENTS

| | | | | | |
|---|---|---|---|---|---|
| 5,977,899 | A | * | 11/1999 | Adams | H03M 7/165 |
| | | | | | 341/145 |
| 2009/0070654 | A1 | * | 3/2009 | Flachs | H03M 13/09 |
| | | | | | 714/763 |
| 2020/0412479 | A1 | * | 12/2020 | Le | H04L 1/0071 |

FOREIGN PATENT DOCUMENTS

| | | | | |
|---|---|---|---|---|
| DE | 19625569 A1 | 1/1998 | | |
| DE | 69430838 T2 | 12/2002 | | |
| JP | 3723115 B2 | * 12/2005 | ......... | G06F 9/30032 |
| WO | WO-2019217349 A1 | * 11/2019 | ......... | G01R 31/1272 |

* cited by examiner

*Primary Examiner* — Chae M Ko
(74) *Attorney, Agent, or Firm* — NORTON ROSE FULBRIGHT US LLP

(57) ABSTRACT

A method for fault-tolerant operation of a processing unit having a plurality of sub-processing units. Each sub-processing unit is configured to process one or more partwords and to determine a result partword therefrom. The processing unit can be configured in a plurality of operation modes and is configured to process partwords of input words, which are arranged in sections of the input words, in the sub-processing units corresponding to the sections, and to determine an output word from the result partwords determined thereby depending on the operation mode. The method includes: determining adaptation partwords from input words to be processed that are suitable for processing in at least one fault-free sub-processing unit, and forming adaptation input words, in which the adaptation partwords are arranged in sections corresponding to the fault-free sub-processing unit; and processing the adaptation input words in a second operation mode to determine an adaptation output word.

15 Claims, 2 Drawing Sheets detect if there is a
fault in a sub-
processing unit          ~100 determine sub-
processing unit is
fault free          ~110 form adaptation input
words          ~120 cause processing unit
to process adaptation
input words          ~130 determine adaptation
result word          ~140

METHOD FOR FAULT-TOLERANT OPERATION OF A PROCESSING UNIT AND OF A PROCESSING ARRANGEMENT, CIRCUIT ARRANGEMENT, AND COMPUTING UNIT

CROSS REFERENCE

The present application claims the benefit under 35 U.S.C. § 119 of German Patent Application No. DE 10 2023 208 612.3 filed on Sep. 6, 2023, which is expressly incorporated herein by reference in its entirety.

FIELD

The present invention relates to a method for fault-tolerant operation of a processing unit having a plurality of sub-processing units, to a circuit arrangement for implementing the same, to a method for fault-tolerant operation of a processing arrangement and to a computing unit.

BACKGROUND INFORMATION

Dedicated hardware accelerators in the form of integrated circuits can be used for computationally intensive computer applications, e.g., in the field of artificial intelligence or neural networks. Such hardware accelerators can comprise a large number of processing units that carry out frequently occurring, elementary operations, e.g., multiply-add operations. High computing speed is achieved in particular through parallelized execution in the large number of processing units. In order to keep the energy consumption and costs of such hardware accelerators low, the integrated circuits can be designed with the smallest possible structure sizes, which are, however, more susceptible to hardware faults. In addition to temporary faults, e.g., bit flips, permanent faults can also occur, e.g., due to variations in the production process or due to aging processes.

SUMMARY

According to the present invention, a method for fault-tolerant operation of a processing unit, a circuit arrangement for carrying out said method, a method for fault-tolerant operation of a processing arrangement, and a computing unit for carrying out said method, are provided. Advantageous example embodiments of the present invention are disclosed herein.

When operating a processing unit having a plurality of sub-processing units for input words to be processed, which are provided for processing in a first operation mode of the processing unit, the present invention makes use of the measure of determining adaptation partwords from the input words to be processed, which are suitable for processing in at least one fault-free functioning sub-processing unit, if there is a fault in a sub-processing unit or in the processing unit, of determining adaptation input words from the adaptation partwords, and of processing the adaptation input words in a second operation mode of the processing unit in order to determine an adaptation output word. The present invention enables the continued operation of processing units with reduced accuracy. Thus, a complete failure of a processing arrangement (e.g. a hardware accelerator), which generally comprises, in addition to faulty processing units, a large number of other (fault-free) processing units, can be avoided. This is particularly advantageous in security-critical applications, such as control algorithms that provide autonomous driving functions for a vehicle using neural networks.

It is assumed that each sub-processing unit is designed to process one or more partwords and to determine a result partword therefrom (in a manner specified by the circuitry). A processing unit is assumed which can be configured in a plurality of operation modes, wherein the processing unit is configured to determine an output word from the result partwords depending on the respectively configured operation mode. The processing unit is arranged to process input words, wherein partwords of input words are processed, wherein the partwords are arranged in sections of the input words and processed in the sub-processing units corresponding to the sections. According to the plurality of sub-processing units and the correspondingly plurality of sections of the input words, at least one input word, in particular all input words, therefore comprises a plurality of partwords. Accordingly, the term partword is to be understood in particular (for at least one of the input words) in the sense of real partwords (i.e., as a real part of the input word or such that a partword is not the same as the input word). The partwords of an input word are disjunctive.

The second operation mode is in particular different from the first operation mode.

According to one example embodiment of the present invention, a check is made for each sub-processing unit to determine whether it is not functioning fault-free in order to detect that the fault is present in a sub-processing unit, and/or the at least one sub-processing unit that is functioning fault-free is determined.

The recognition that there is a fault in a sub-processing unit or in the processing unit can be effected by suitable fault recognition algorithms. Such fault recognition algorithms can, for example, cause the processing unit to process one or more sets of predetermined input words for which the output word is known and compare the result word obtained in the processing with the known output word in order to recognize faults. By appropriately selecting the predetermined input words, the fault can be further narrowed down to (at least) one specific sub-processing unit or it can be determined for each sub-processing unit whether or not it is functioning fault-free. For example, predetermined input words can be selected so that the output word depends exclusively on the correct function of a single sub-processing unit. A sub-processing unit is determined or classified as functioning fault-free if no fault is found for it, i.e., if it is not functioning without a fault.

If there is no fault in a sub-processing unit or in the processing unit, the operation of the processing unit is effected in particular in the intended manner, i.e. using all sub-processing units, wherein the input words are used without any change and processing is effected in the first operation mode.

According to one example embodiment of the present invention, the processing unit implements a mathematical operation dependent on the operation mode, which includes or is forming a product of the input words or forming products of the partwords of the input words, wherein each of the sub-processing units is designed to determine a product of in each case two partwords of the input words as a result partword, wherein the mathematical operation is in particular a multiply-add operation. Products frequently occur, for example, in scalar products or matrix operations used in neural networks, in particular within the framework of a multiply-add operation, so that corresponding processing units execute them quickly and in parallel when using a plurality of processing units. The term "multiply-add operation" (or multiply-accumulate operation) refers to a multiply-add operation in which two factors are multiplied together and the product of the two factors is added to form a continuous summand.

According to one example embodiment of the present invention, forming the adaptation partwords for each input word includes rounding the input words to a more significant portion of which the bit width corresponds to that of the relevant adaptation partword to be formed, and using the more significant portion as the relevant adaptation partword. This means that the operation is carried out with reduced accuracy.

According to one example embodiment of the present invention, rounding is in the direction of zero. This procedure is useful for specific applications (e.g. neural networks), since the distribution of a large number of input words is retained, i.e. there is no distortion of the distribution of the rounded values compared with the original values. Rounding in the direction of zero means that for positive values to be rounded, the smaller of the possible values between which the value to be rounded lies is selected as the rounded value, and that for negative values to be rounded, the larger of the possible values between which the value to be rounded lies is selected as the rounded value. For binary values that are to be rounded to a specific number of bits, this means that for positive values, the high-order bits of the value corresponding to the specific number are retained and the low-order bits (i.e. bits with a lower significance than the specific number of high-order bits) are truncated, and that for negative values, the low-order bits are truncated and 1 is added to the high-order bits (i.e. bit 1 is added to the lowest-order bit of the specific number of high-order bits of the value to be rounded).

According to one example embodiment of the present invention, a bit-shift operation is carried out to map the adaptation output word to an adaptation result word. As a result, the significance of the adaptation result partwords and thus the adaptation output word can be corrected. This correction is dependent on the at least one fault-free functioning sub-processing unit used.

According to one example embodiment of the present invention, the first operation mode is a processing of the input words in a first bit width, in particular in a full bit width, and the second operation mode is a processing of the input words in a second bit width; wherein the second bit width is smaller than the first bit width, wherein the second bit width is in particular an integer fraction of the first bit width. For example, the first operation mode can correspond to a multiplication operation or a multiply-add operation in which the input words as a whole, i.e. in full bit width, are in each case understood as numerical values that are multiplied together and their products added up if applicable. In this example, the second operation mode can correspond to a multiplication operation or a multiply-add operation in which partwords of the input words that comprise half or a quarter of the full bit width, for example, are in each case (independently) interpreted as numerical values that are multiplied together and their products added up if applicable, so that a plurality of results is obtained according to the number of partwords in an input word.

A circuit arrangement according to an example embodiment of the present invention comprises a processing unit and a control arrangement, wherein the processing unit comprises a plurality of sub-processing units, wherein each sub-processing unit is designed to process one or more partwords and to determine a result partword therefrom, wherein the processing unit (2) can be configured in a plurality of operation modes and is designed to process partwords of input words, which are arranged in sections of the input words, in the sub-processing units corresponding to the sections, and to determine an output word from the result partwords determined thereby depending on the respectively configured operation mode. The control arrangement (or control unit) is designed to carry out a method according to the present invention.

According to one example embodiment of the present invention, the control arrangement comprises a control circuit, wherein the control circuit is designed to generate at least a first configuration signal for configuring the processing unit, which configures the processing unit according to (or in) one of the operation modes. If applicable, the control circuit can also carry out the determination of whether a sub-processing unit is functioning fault-free or with a fault.

According to one example embodiment of the present invention, the control arrangement comprises an adjustment circuit that is designed to receive input words to be processed and to form the adaptation input words therefrom according to at least one second configuration signal.

In example embodiments of the present invention, the control circuit is designed to generate the at least one second configuration signal so that the adaptation input words are formed by means of the adaptation partwords. In particular, the adjustment circuit can also implement a rounding of the input words in order to determine the adaptation partwords.

According to one example embodiment of the present invention, the control arrangement comprises a bit-shift circuit that is designed to shift an adaptation output word of the processing unit by a number of bits in order to obtain the adaptation result word. In one example embodiment, the number of bits can be predefinable according to a third configuration signal. In one embodiment, the control circuit is designed to generate the third configuration signal depending on the at least one fault-free functioning sub-processing unit. If not already done in the processing unit, the significance of the bits of the adaptation output word can be corrected.

In a method according to the present invention for fault-tolerant operation of a processing arrangement, which comprises a large number of processing units as described above, a large number of input words is provided for processing in a first operation mode in processing units of the large number of processing units allocated to the input words, wherein, if there is a fault for at least one processing unit of the plurality of processing units, the processing of the input words allocated to the at least one processing unit for which there is a fault is effected by a method for fault-tolerant operation of a processing unit according to the present invention, and wherein the processing of the input words allocated to processing units for which there is no fault is effected in the first operation mode.

A computing unit according to the present invention comprises such a processing arrangement and a control unit. The control unit is designed to carry out a method according to the present invention for fault-tolerant operation of the processing arrangement.

Further advantages and embodiments of the present invention can be found in the description herein and the figures.

The present invention is shown schematically in the figures on the basis of exemplary embodiments and is described below with reference to the figures.

DETAILED DESCRIPTION OF EXAMPLE EMBODIMENTS

Figure 1:
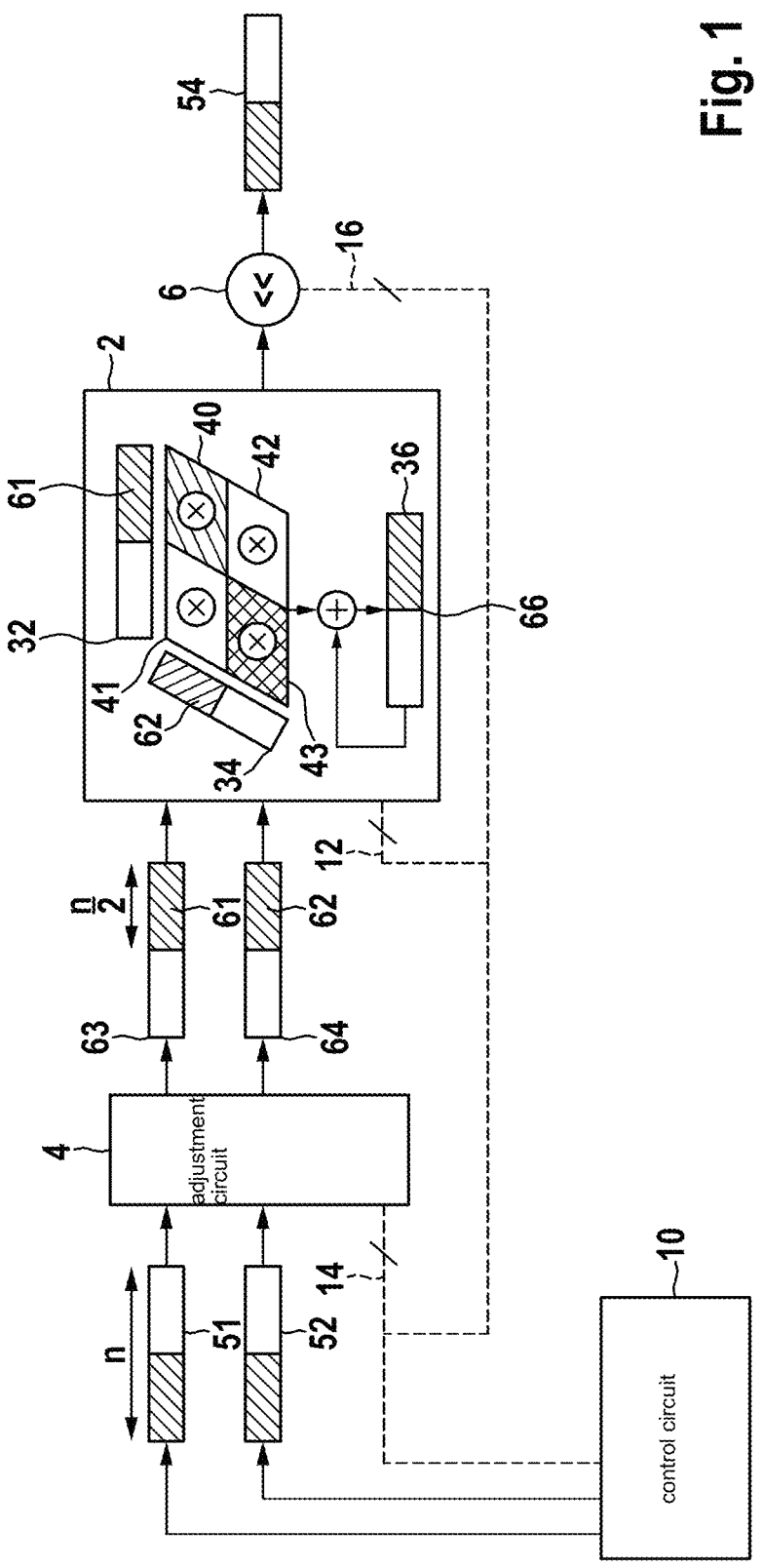
FIG. 1 shows an exemplary processing unit along with upstream and downstream function blocks according to one example embodiment of the present invention.

FIG. 1 shows an exemplary processing unit 2 along with upstream and downstream function blocks according to one embodiment of the present invention.

For example, the processing unit 2 is designed to carry out multiply-add operations on binary values, wherein both full-bit-width and half-bit-width processing are supported. When processing in full bit width, the processing unit shown carries out the following calculation for input values or input words a, b, which in each case comprise bits (it is assumed that n an even number is greater than zero, e.g. 8, 16, 32 or another even number):

$$c := = c + a \cdot b$$

The usual notation used in computer science is that a variable to the left of the ":=" operator is assigned the result of the expression to the right of the ":=" operator, wherein the expression to the right of the ":=" operator can contain the variable itself. The variable is therefore assigned a new value, which may be dependent on the old value. According to the above formula, the variable c is thus an accumulated sum of the products of the input words a, b, wherein, for example, a plurality of input words a, b is processed in succession and their products added up.

When processing in half bit width, partwords of the input words, which in each case comprise n/2 bits, are used. The processing unit carries out the following calculations for input values or input words a, consisting of partwords $a_1$, $a_0$, and b, consisting of partwords $b_1$, $b_0$:

$$c_1 := c_1 + a_1 \cdot b_1$$

$$c_0 := c_0 + a_0 \cdot b_0$$

The variables $c_1$ and $c_0$ are formed independently of one another.

Regardless of the desired bit width, calculations are initially effected by the processing unit at partword level, i.e. starting from partwords with a bit width of n/2 bits. For calculations with full bit width, the sub-results are combined. With $$a = a_1 \cdot 2^{\frac{n}{2}} + a_0$$

and $$b = b_1 \cdot 2^{\frac{n}{2}} + b_0$$

wherein $a_0$, $a_1$, $b_0$ and $b_1$ in each case comprises n/2 bits, the following applies:

$$a \cdot b = a_1 \cdot b_1 \cdot 2^n + a_1 \cdot b_0 \cdot 2^{\frac{n}{2}} + a_0 \cdot b_1 \cdot 2^{\frac{n}{2}} + a_0 \cdot b_0$$

A multiplication by $2^i$ corresponds to a left shift of the bits of the relevant binary number by i bits (if the significance of the bits increases to the left). The multiplications with the relevant power of 2, when processing with full bit width, are therefore realized by the circuitry by a left shift (wherein bits with value 0 are inserted from the right and it is assumed that the significance of the bits increases from right to left). The processing unit 2 comprises sub-processing units 40, 41, 42, 43, which are designed to determine the above products of the partwords of the input words, wherein a sub-processing unit is provided in each case for determining $a_1 \cdot b_1$, $a_1 \cdot b_0$, $a_0 \cdot b_1$ and $a_0 \cdot b_0$. The partwords of the input words are read in via input registers 32, 34 of the processing unit, for example. The products of the partwords determined by the sub-processing units 40, 41, 42, 43 are designated as result partwords. For example, a first sub-processing unit 40 determines the product $a_0 \cdot b_0$ as a result partword, a second sub-processing unit 41 determines the product $a_1 \cdot b_0$ as a result partword, a third sub-processing unit 42 determines the product $a_0 \cdot b_1$ as a result partword and a fourth sub-processing unit 43 determines the product $a_1 \cdot b_1$ as a result partword.

The processing unit 2 can use the result partwords to determine a result to be output, which is referred to as the output word. This is effected in a configurable manner, i.e. which result partwords are used to determine the output word and how these are combined can be configured, e.g. by a (first) configuration signal 12, which is transmitted via a corresponding control line. A plurality of configuration options or operation modes is generally predefined by the circuitry. Configuration options for the exemplary processing unit 2 shown are, in particular, processing in full bit width and processing in half bit width.

Generally speaking, the processing unit comprises a plurality of sub-processing units and can be configured in different operation modes or processing modes (in the processing unit shown, for example, processing in full bit width and processing in half bit width). Each sub-processing unit processes partwords of the input words in a predetermined manner in order to determine a relevant result partword. The output word is determined from the result partwords depending on the operation mode, i.e. how the output word is formed from the result partwords depends on the operation mode. Generally, different operation modes lead to different output words for the same input words (apart from special input words).

An example of a processing unit with four sub-processing units in a 2×2 arrangement is shown, wherein the input words can be divided into two partwords in each case. In general, the processing unit can also comprise a different number of sub-units and/or the input words can be divided into other numbers of partwords independently of one another, according to the number and arrangement of the sub-units. Accordingly, there can be further or other options (corresponding to different operation modes) for processing the input words or determining the output word from the result partwords. For example, 16 sub-processing units could be given in a 4×4 arrangement, wherein, for example, three operation modes are provided, namely processing in full bit width, processing in half bit width and processing with a quarter of the bit width (for example, if the input words comprise a bit width of 32 bits, processing with 1×32 bits, processing with 2×16 bits and processing with 4×8 bits).

When processing in half bit width, only the result partwords of the second sub-processing unit 40 and the third sub-processing unit 43, which correspond to the products of partwords $a_0 \cdot b_0$ and $a_1 \cdot b_1$, are used. As explained above, these are added independently of one another to form partwords $c_1$, $c_0$. The partwords $c_1$, $c_0$ are, for example, stored in an output register 36 or accumulation register, wherein they are regarded as mutually independent values, i.e. the partwords of the output word are two values. The accumulation operation is symbolically indicated in the figure. It is again assumed that a plurality of input words is generally processed consecutively, i.e. the products of the relevant partwords $a_0 \cdot b_0$ and $a_1 \cdot b_1$ is added consecutively to the partwords $c_1$, $c_0$ in the output register 36. The output register 36 is initially (prior to adding up) reset to a specific value, in particular zero.

When processing in full bit width, the result partwords of all sub-processing units 40, 41, 42 43, which correspond to the products of partwords $a_0 \cdot b_0$, $a_1 \cdot b_0$, $a_0 \cdot b_1$ and $a_1 \cdot b_1$, are used. As explained above, these are added to the output word, which here represents a single value as a whole, taking into account the relevant significance. The output word is again stored in the output register 36 or accumulation register and can be added up there if there is a plurality of consecutive pairs of input words.

If a sub-processing unit fails, another sub-processing unit that is still functioning fault-free can still be used for calculations. For example, the fourth sub-processing unit 43 in the figure is not functioning fault-free, while the other three sub-processing units 40, 41, 42 are functioning fault-free.

In such a situation, input words 51, 52, which are to be processed with full bit width, can be processed with reduced accuracy. For this purpose, it is provided to determine a fault-free functioning sub-processing unit, here e.g. the first sub-processing unit 40, and to form adapted partwords from the input words 51, 52, which are designated as adaptation partwords 61, 62, which are suitable for processing by the fault-free functioning sub-processing unit 40. Words designated as adaptation input words 63, 64 are formed, which contain the adaptation partwords 61, 62, wherein the adaptation partwords 61, 62 are arranged at positions in the adaptation input words 63, 64, so that they are processed by the fault-free functioning sub-processing unit 40. In the example shown (first sub-processing unit 40 is used), in each case these are the low-order n/2 bits of the adaptation input words 63, 64. If another functioning sub-processing unit is used, the adaptation partwords 61, 62 are arranged at correspondingly different positions in the adaptation input words 63, 64. For example, the high-order n/2 bits of the input words 51, 52 are used as adaptation partwords 61, 62, so that the adaptation partwords 61, 62 are equal to rounded values of the input words 51, 52 up to a power of two (e.g.

$$2^{\frac{n}{2}}$$

or $$2^{-\frac{n}{2}}$$

The bits of the sections of the adaptation input words 63, 64 in which there is no adaptation partword 61, 62 (in the example shown, the high-order n/2 bits of the adaptation input words 63, 64) can have any value and/or be set to any value (e.g. zero), since these sections are not included in the ultimately determined adaptation result word 54.

The forming of the adaptation partwords 61, 62 is effected from the input words 51, 52 and the forming of the adaptation input words 63, 64 is effected from the adaptation partwords 61, 62, in particular by a function block connected upstream of the processing unit 2, which is designated as the adjustment circuit 4. The adjustment circuit 4 can be configured by a (second) configuration signal 14, which is transmitted via a corresponding control line. Due to this configuration, it is specified how the adjustment circuit 4 maps the input words 51, 52 to the adaptation input words 63, 64, i.e. how the adaptation partwords 61, 62 are formed from the input words 51, 52 and the adaptation input words 63, 64 are formed therefrom. In the fault-free case, i.e. if all sub-processing units 40, 41, 42, 43 are functioning fault-free, the input words 51, 52 are mapped to the adaptation input words 63, 64 without any change.

For processing, the adaptation input words 63, 64 are read in as explained above, e.g. via the input registers 32, 34. During processing, the fault-free first sub-processing unit 40 determines an adaptation result partword that is added to the value in the output register 36, wherein the processing unit 2 is configured according to a suitable one of the operation modes (configuration options), namely here half-bit width processing, so that the adaptation result partwords to the low-order bits of the output register 36 are added up (if successively processing a plurality of input words). The word formed in this way can be described as an adaptation output word 66.

Generally speaking, for input words that are provided for processing in a first operation mode (here, full bit width) or for which processing in the first operation mode is provided, adaptation input words are formed that are processed in a second operation mode (here, half bit width) that is different from the first operation mode. In particular, the adjustment circuit is configured to form the adaptation input words from the input words, and the processing circuit is configured to the second operation mode, i.e. configured to carry out the processing in the second operation mode in order to form the adaptation output word.

Since the adaptation output word in particular was formed using the second operation mode (half bit width) instead of the first operation mode (full bit width) actually provided, it is possible that the position or significance of partwords of the adaptation output word does not correspond to that which should actually be present if processing had been effected in the first operation mode. To correct this, the bits of the adaptation output word 66 can be shifted to the left by a specific number of bits, wherein bits with a value of 0 are inserted from the right to determine a result word, which is designated as the adaptation result word 54. Bits that are shifted to the left beyond the bit width of the adaptation output word or the result word (i.e. that are shifted to a position whose significance exceeds the highest significance of the adaptation output word or the result word) are dropped or omitted. The number of bits to be shifted is determined such that the mapping of the input words 51, 52 to the adaptation partwords 61, 62 or the adaptation input words 63, 64 is compensated for. The shifting is effected in particular by a function block connected downstream of the processing unit 2, which is designated as a bit-shift circuit 6. The bit-shift circuit 6 can be configured with a (third)

configuration signal 16, which is transmitted via a corresponding control line, so that it carries out the shift by the determined number of bits. If the processing unit 2 includes an internal bit-shift unit (not shown), this shifting by the specific number of bits can already be effected partially or completely within the processing unit 2. For example, the adaptation result partwords can already be shifted.

Overall, the described procedure results in a calculation with reduced accuracy (i.e. with fewer significant bits), so that the adaptation result word has a lower accuracy.

In particular, a control circuit 10 is provided, which initiates the processes described above, i.e. transfers the input words 51, 52 to the processing unit 2 or the adjustment circuit 4 and generates the configuration signals 12, 14, 16 for the processing unit 2, the adjustment circuit 4 and, if applicable, the bit-shift circuit 6. The control circuit 10 forms a control arrangement together with the adjustment circuit 4 and, if applicable, the bit-shift circuit 6. The control arrangement formed in this way is designed to carry out a method according to the present invention for fault-tolerant operation of a processing unit, such as that explained below.

The control arrangement (or control unit) together with the processing unit forms a circuit arrangement that is fault-tolerant in accordance with the method. A single control circuit 10 can be provided for a plurality of processing units along with corresponding upstream and downstream function blocks. Accordingly, the circuit arrangement can comprise a plurality of processing units along with corresponding upstream and downstream function blocks. The plurality of processing units or the large number of processing units form a processing arrangement. A processing unit can comprise a processing arrangement and a control unit that is designed to carry out the method for fault-tolerant operation of a processing unit for input words to be processed in the first operation mode in one or more processing units of the processing arrangement for which a fault is detected, and to carry out the processing in the first operation mode for processing units of the processing arrangement for which no fault is detected.

Figure 2:
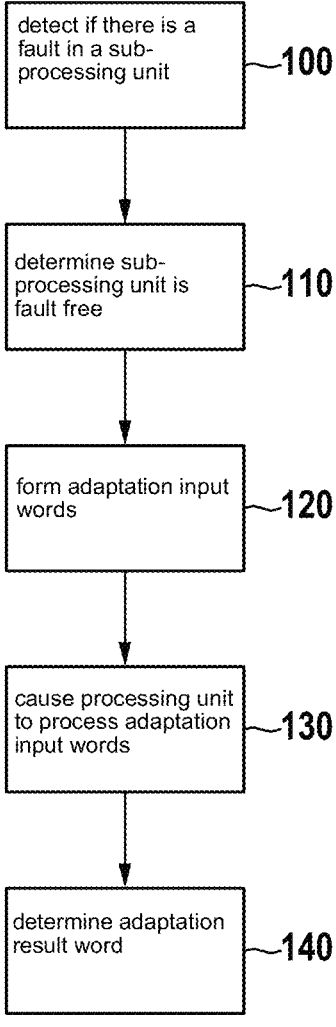
FIG. 2 shows a flow chart of the method for fault-tolerant operation of a processing unit according to one example embodiment of the present invention.

FIG. 2 shows a flow chart of the method for fault-tolerant operation of a processing unit according to one embodiment. As mentioned above, the method can be implemented in particular by a control arrangement that comprises a control circuit, an adjustment circuit and possibly a bit-shift circuit.

In an optional step 100, it is detected that there is a fault in a sub-processing unit of the processing unit, i.e. that it is not functioning fault-free, i.e. that an operation carried out thereby delivers erroneous results. In particular, a check is made for each sub-processing unit to determine whether it is not functioning fault-free (or with a fault). This can be effected, for example, by carrying out calculations with the processing unit with suitable predetermined input values or input words for which the results are known. If the calculated results do not match the known results, a fault is assumed. The predetermined input values are selected, for example, so that only a single sub-processing unit is involved in the calculations.

For example, step 100 or the check therein can be carried out periodically or at specific points in time (such as starting a circuit arrangement that includes the processing unit). Alternatively or additionally, step 100 can also be initiated after it has been detected that the processing unit is not functioning fault-free, for example within the framework of checking the function of the processing unit. Step 100 is then used to determine that the fault is caused by a sub-processing unit and not by another functional element of the processing unit.

In an optional step 110, at least one sub-processing unit is determined to function fault-free. The procedure can be analogous to the check in step 100, wherein a sub-processing unit is determined to be functioning fault-free if it is not detected to be functioning with a fault, i.e. if the results calculated for the predetermined input values match the known results.

Information about the presence of a fault in a sub-processing unit and/or which sub-processing unit is functioning fault-free or which sub-processing units are functioning fault-free may already be known from a previous check and can, for example, be stored in a memory of the control circuit. Accordingly, step 100 or step 110 can be omitted if applicable.

Furthermore, it is assumed that processing in a first operation mode of the processing circuit is provided for input words to be processed. It is further assumed that processing in the first operation mode can lead to faults due to the fault present.

In step 120, adaptation input words are formed from the input words to be processed. Adaptation partwords are determined from the input words to be processed. The adaptation partwords are suitable for processing in the at least one fault-free sub-processing unit, e.g. they comprise a corresponding bit width. The adaptation input words are also formed, which in each case contain at least one adaptation partword. The at least one adaptation partword is inserted in at least one section of the relevant adaptation input word that corresponds to the at least one fault-free functioning sub-processing unit, i.e. in a section in which the at least one partword that is processed by the fault-free functioning sub-processing unit is arranged in each case. Step 120 can be effected, for example, by transmitting the input words to be processed to the adjustment circuit and controlling the adjustment circuit to form the adaptation input words, wherein in particular a configuration of the adjustment circuit is carried out with the second configuration signal.

The adaptation partwords are formed in particular by rounding the input words to be processed. The number of significant digits when rounding is selected according to the bit width of the adaptation partwords (e.g. equal to the bit width of the adaptation partwords or equal to the bit width of the adaptation partwords except for a sign bit or the like). The significant digits after rounding are in each case used as an adaptation partword and the non-significant digits after rounding are omitted, which can be regarded as a rescaling (and omission of the decimal places) with a corresponding power of two.

The bits of sections of the adaptation input words in which no adaptation partword is arranged can have any value or can be set to a specific value, e.g. zero.

In step 130, the processing unit is caused to process the adaptation input words in a second operation mode (which is different from the first operation mode). In particular, the processing unit is configured (by the first configuration signal) in the second operation mode. An adaptation output word is obtained by processing the adaptation input words in the second operation mode.

For example, the adaptation input words are transmitted to input registers of the processing unit and processing (after configuration in the second operation mode) is initiated by means of a control signal and/or a clock signal. Since the adaptation partwords are arranged in sections of the adaptation input words corresponding to the at least one fault-free functioning sub-processing unit, processing of the adaptation partwords is effected by the at least one fault-free functioning sub-processing unit, so that one or more adaptation result partwords are determined, from which the adaptation output word is obtained. In particular, this can include a corresponding configuration of the processing unit with the first configuration signal.

In step 140, an adaptation result word is determined from the adaptation output word. Step 140 includes one or more sub-steps or sub-operations carried out by the processing unit, and/or one or more sub-steps or sub-operations carried out by the processing unit after processing. Sub-operations carried out by the processing unit are, in particular, sub-operations that are carried out in order to execute the mathematical operation implemented by the processing unit. With a multiply-add operation (as in FIG. 1), this is the adding up of the adaptation result partwords. Bit-shift operations can potentially also be effected by the processing unit. By executing the sub-operations carried out by the processing unit, an adaptation output word is obtained, e.g. in the output register of the processing unit. A sub-operation that is carried out after processing by the processing unit is, in particular, at least one bit-shift operation corresponding to the at least one fault-free functioning sub-processing unit. That is, at least one bit-shift operation takes place that compensates for the mapping of the input words to be processed to the adaptation input words and the associated change in the position of the adaptation partwords in the adaptation input words compared with the original position (i.e. significance), provided that this is not already effected by a sub-operation carried out by the processing unit. The at least one bit-shift operation is effected, for example, with the bit-shift circuit, which is configured for this purpose with the third configuration signal. The bit-shift operation acts on the adaptation output word and shifts its bits in order to obtain the adaptation result word (depending on the direction in which the bit-shift operation is effected, zeros can be inserted on the right or left).

What is claimed is:

1. A method for fault-tolerant operation of a processing unit having a plurality of sub-processing units, wherein each sub-processing unit is configured to process one or more partwords and to determine a result partword from the one or more partwords, wherein the processing unit can be configured in a plurality of operation modes and is configured to process partwords of input words, which are arranged in sections of the input words, in the sub-processing units corresponding to the sections, and to determine an output word from result partwords determined thereby depending on a configured operation mode of the processing unit, the method comprising the following steps:

for input words to be processed, which are provided for processing by the processing unit in a first operation mode of the plurality of operation modes when there is a fault in a sub-processing unit or the processing unit:

determining adaptation partwords from input words to be processed, which are suitable for processing in at least one fault-free functioning sub-processing unit, and forming adaptation input words, in which the adaptation partwords are arranged in sections corresponding to the at least one fault-free functioning sub-processing unit; and processing the adaptation input words by the processing unit in a second operation mode of the plurality of operation modes, in order to determine an adaptation output word.

2. The method according to claim 1, further comprising:

checking, for each sub-processing unit, whether the sub-processing unit is not functioning fault-free, in order to detect that the fault is in a sub-processing unit; and/or determining at least one of the sub-processing units is functioning fault-free.

3. The method according to claim 1, wherein:

the processing unit implements an operation mode-dependent mathematical operation which is or includes forming a product of the input words or forming products of the partwords of the input words;

each of the sub-processing units is configured to determine a product of in each case two partwords of the input words as a result partword; and the mathematical operation is a multiply-add operation.

4. The method according to claim 1, wherein the forming of the adaptation partwords for each input word includes rounding the input words to be processed to a more significant portion of which a bit width corresponds to that of the adaptation partword to be formed, and using the more significant portion as the adaptation partword.

5. The method according to claim 4, wherein the rounding is in a direction of zero.

6. The method according to claim 1, wherein a bit-shift operation is carried out in order to map the adaptation output word of the processing unit to an adaptation result word.

7. The method according to claim 1, wherein:

the first operation mode is a processing of the input words in a first bit width including a full bit width, and the second operation mode is a processing of the input words in a second bit width;

wherein the second bit width is smaller than the first bit width;

wherein the second bit width is an integer fraction of the first bit width.

8. A circuit arrangement comprising:

a processing unit; and a control arrangement;

wherein the processing unit includes a plurality of sub-processing units, wherein each sub-processing unit is configured to process one or more partwords and to determine a result partword from the one or more partwords, wherein the processing unit can be configured in a plurality of operation modes and is configured to process partwords of input words, which are arranged in sections of the input words, in the sub-processing units corresponding to the sections, and to determine an output word from the result partwords determined thereby depending on a configured operation mode of the processing unit;

wherein the control arrangement is configured to:

for input words to be processed, which are provided for processing by the processing unit in a first operation mode of the plurality of operation modes when there is a fault in a sub-processing unit or the processing unit:

determine adaptation partwords from input words to be processed, which are suitable for processing in at least one fault-free functioning sub-processing unit, and forming adaptation input words, in which the adaptation partwords are arranged in sections corresponding to the at least one fault-free functioning sub-processing unit; and process the adaptation input words by the processing unit in a second operation mode of the plurality of operation modes, in order to determine an adaptation output word.

9. The circuit arrangement according to claim 8, wherein the control arrangement includes a control circuit that is configured to generate at least a first configuration signal for configuring the processing unit, which configures the processing unit according to one of the operation modes.

10. The circuit arrangement according to claim 8, wherein the control arrangement includes an adjustment circuit, which is configured to receive input words to be processed and to form from the received input words, the adaptation input words corresponding to at least one second configuration signal.

11. The circuit arrangement according to claim 9, wherein the control arrangement includes an adjustment circuit, which is configured to receive input words to be processed and to form from the received input words, the adaptation input words corresponding to at least one second configuration signal, and the control circuit is configured to generate the at least one second configuration signal, so that the adaptation input words are formed using the adaptation partwords.

12. The circuit arrangement according to claim 8, wherein:

the control arrangement includes a bit-shift circuit, which is configured to shift the adaptation output word of the processing unit by a number of bits in order to obtain an adaptation result word; and the number of bits is predefinable according to a third configuration signal.

13. The circuit arrangement according to claim 9, wherein:

the control arrangement includes a bit-shift circuit, which is configured to shift the adaptation output word of the processing unit by a number of bits in order to obtain an adaptation result word;

the number of bits is predefinable according to a third configuration signal; and the control circuit is configured to generate the third configuration signal depending on the at least one fault-free functioning sub-processing unit.

14. A method for fault-tolerant operation of a processing arrangement which includes a large number of processing units, wherein each processing unit includes a plurality of sub-processing units, wherein each sub-processing unit is configured to process one or more partwords and to determine a result partword from the one or more partwords, wherein each processing unit can be configured in a plurality of operation modes and is configured to process partwords of input words, which are arranged in sections of the input words, in the sub-processing units corresponding to the sections, and to determine an output word from the result partwords determined thereby depending on a configured operation mode, the method comprising:

providing a large number of input words for processing in a first operation mode in processing units of the large number of processing units allocated to the input words;

based on there being a fault for at least one processing unit of the large number of processing units, the processing of the input words allocated to the at least one processing unit for which there is a fault is effected by:

determining adaptation partwords from input words to be processed, which are suitable for processing in at least one fault-free functioning sub-processing unit, and forming adaptation input words, in which the adaptation partwords are arranged in sections corresponding to the at least one fault-free functioning sub-processing unit, and processing the adaptation input words by the processing unit in a second operation mode of the plurality of operation modes, in order to determine an adaptation output word; and wherein the processing of the input words that are allocated to processing units for which there is no fault is effected in the first operation mode.

15. A computing unit, comprising:

a processing arrangement including a large number of processing units, wherein each processing unit includes a plurality of sub-processing units, wherein each sub-processing unit is configured to process one or more partwords and to determine a result partword from the one or more partwords, wherein each processing unit can be configured in a plurality of operation modes and is designed to process partwords of input words, which are arranged in sections of the input words, in the sub-processing units corresponding to the sections, and to determine an output word from the result partwords determined thereby depending on the respectively configured operation mode; and a control unit configured to:

provide a large number of input words for processing in a first operation mode in processing units of the large number of processing units allocated to the input words, based on there being a fault for at least one processing unit of the large number of processing units, the processing of the input words allocated to the at least one processing unit for which there is a fault is effected by:

determining adaptation partwords from input words to be processed, which are suitable for processing in at least one fault-free functioning sub-processing unit, and forming adaptation input words, in which the adaptation partwords are arranged in sections corresponding to the at least one fault-free functioning sub-processing unit, and processing the adaptation input words by the processing unit in a second operation mode of the plurality of operation modes, in order to determine an adaptation output word; and wherein the processing of the input words that are allocated to processing units for which there is no fault is effected in the first operation mode.

\*   \*   \*   \*   \*